(12) United States Patent
Pietrzyk et al.

(10) Patent No.: US 8,149,554 B2
(45) Date of Patent: Apr. 3, 2012

(54) APPARATUS FOR FAULT TOLERANT DIGITAL INPUTS

(75) Inventors: Arthur P. Pietrzyk, Thompson, OH (US); Peter M. Delic, Willoughby, OH (US); William E. Waltz, Mentor, OH (US); Russell W. Brandes, Brunswick, OH (US); Dennis G. Schneider, New Berlin, WI (US); Louis L. Smet, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 303 days.

(21) Appl. No.: 12/488,690

(22) Filed: Jun. 22, 2009

(65) Prior Publication Data
US 2010/0125372 A1 May 20, 2010

Related U.S. Application Data

(60) Provisional application No. 61/115,795, filed on Nov. 18, 2008, provisional application No. 61/115,801, filed on Nov. 18, 2008, provisional application No. 61/115,807, filed on Nov. 18, 2008.

(51) Int. Cl.
| | |
|---|---|
| *H02H 3/00* | (2006.01) |
| *G05D 11/00* | (2006.01) |
| *G05D 3/12* | (2006.01) |
| *G05D 5/00* | (2006.01) |
| *G05D 9/00* | (2006.01) |
| *G05D 17/00* | (2006.01) |

(52) U.S. Cl. ............ 361/78; 700/293; 700/286; 700/21; 701/48

(58) Field of Classification Search ...................... 361/78
See application file for complete search history.

(56) References Cited

U.S. PATENT DOCUMENTS

| 4,862,400 | A * | 8/1989 | Selbrede ........................ 361/752 |
| 6,522,515 | B1 * | 2/2003 | Whitney ........................ 361/104 |
| 7,813,820 | B2 * | 10/2010 | Opem et al. .................... 700/79 |
| 2006/0015244 | A1 | 1/2006 | Hawkins et al. |
| 2006/0116803 | A1 | 6/2006 | Armbruster et al. |
| 2007/0213854 | A1 | 9/2007 | El-Sayed |

OTHER PUBLICATIONS

European Search Report for EP 09176348, Feb. 26, 2010.
Siemens, Automation System S7-400H Fault-tolerant Systems Manual, Edition Jan. 2004, Chapter 7.

* cited by examiner

*Primary Examiner* — Jared Fureman
*Assistant Examiner* — Lucy Thomas
(74) *Attorney, Agent, or Firm* — Boyle Fredrickson, S.C.; R. Scott Speroff; John M. Miller

(57) ABSTRACT

An input termination board for use with an industrial controller in a safety system is disclosed herein. The industrial controller may be populated with standard input modules according to the application. The termination board, in conjunction with the controller allows the standard input modules to be used as safety inputs. The termination board provides simplified wiring between the input modules and the remote devices by splitting each of the signals generated by the remote device into separate inputs for two different input modules. In addition, a program executing on the controller of the safety system monitors and tests each of the inputs in both input modules to verify proper operation of the inputs. If the program detects a fault in either input module, the safety system may alternately shut down according to a fail-safe procedure or continue operating under a fault-tolerant mode of operation.

20 Claims, 2 Drawing Sheets

APPARATUS FOR FAULT TOLERANT DIGITAL INPUTS

CROSS-REFERENCE TO RELATED APPLICATIONS

This application claims the benefit of U.S. Provisional Application Nos. 61/115,795, 61/115,801, and 61/115,807. Each of the provisional applications entitled "Termination for Fault Tolerant I/O and AOI's for SIL 2 ControlLogix" was filed on Nov. 18, 2008 and is hereby incorporated by reference in its entirety.

BACKGROUND OF THE INVENTION

The subject matter disclosed herein relates to fault tolerant digital inputs for a safety control system. More specifically, the subject matter relates to a termination board for connecting remote devices that provide digital signals to a controller, such as a programmable logic controller, for a safety system.

A Programmable Logic Controller (PLC) is a special purpose computer typically used for real-time control of an industrial machine or process. The PLC has a modular design such that it may be readily configured for numerous types of machines or processes across a wide variety of industries. The PLC includes a rack, or multiple racks, typically containing an integral power supply and multiple slots to plug in different modules. The rack further incorporates a backplane such that different modules may communicate with each other. A wide variety of modules exist to accommodate the wide variety of applications for a PLC. This modular design provides a cost benefit because standard modules may be developed that are mass produced and configurable according to the machine or process to be controlled.

Some of these standard modules include the processor module as well as input and output modules. The inputs and outputs may be digital, where the presence or absence of a DC voltage level indicates a logical one or zero, or analog, where a continuously variable input voltage represents a range of input data. The input and output modules may further include varying number of channels, for example eight, sixteen, or thirty-two, such that the PLC may be easily configured according to the machine or process to be controlled.

Industrial control systems differ from conventional computer systems in that they provide highly reliable operation and deterministic real-time control. In part, this requires that data communicated between the processor and the input and output modules be transmitted in a predictable sequence. Further, a program must execute on the PLC in a predictable sequence to execute the control functions of the PLC. This program is typically developed in "ladder logic," consisting of a series of "rungs." Each rung typically monitors one or more inputs or internal conditions on the input portion of the rung to determine whether to execute the output portion of the rung. The output portion of the rung may set an output channel, start an internal timer, or perform some other function. The program executes as a continuous loop where one loop through the program constitutes a scan of the program.

"Safety controllers" are also special purpose computers used to ensure the safety of humans working in the environment of an industrial process which may be implemented using a PLC. A safety controller may share some hardware, such as remote sensors and actuators, when used for machine control and safety; however, in a process application the safety controller operates independently of the process controller. Typically, a safety controller operates independently of a process controller and is connected to a separate set of sensors and actuators to monitor the process forming a safety control system. The safety control system monitors operation of the process and may initiate an orderly shutdown of the process if the primary process control system fails. The safety control system is designed to monitor the machine or process and to protect machine operators, technicians, or other individuals required to interact with the machine or process as well as protect the equipment itself. The safety control system monitors the process for a potentially unsafe operating condition which may be caused by an out of control process. If the safety system detects a potentially unsafe operating condition, the safety controller operates to put the machine or process into a safe state.

Many of the sensors in the safety control system provide discrete inputs which are commonly at 24 volts DC and normally high, or on. While the inputs may be wired either normally high or normally low, these inputs are often wired such that a "safety event" causes an input to transition to a low, or off, state. A safety event may be detected when an input monitoring at least a portion of the machine or process for a safe operating condition changes state. For example, an input may indicate a light curtain has been broken or an operator stepped on a mat in a specific portion of the machine. By wiring the input to go to a low state to trigger a safety event the safety system is requiring a positive action, such as holding the input high, to indicate a safe state. By requiring an input to be on to indicate a safe state, the safety controller prevents the machine from operating under conditions in which the safety controller would otherwise not be able to detect a safety event. For example, a broken wire, mistaken wiring, or a tripped circuit breaker may each remove power from the input preventing the input from operating. By requiring the input to be high to indicate a safe state, the safety controller will treat such conditions where it is unable to monitor an input as unsafe and require that the machine enter a safe state.

To this extent, a certification process has been established to provide Safety Integrity Level (SIL) ratings to equipment, identifying different degrees of safety. These ratings are determined by such factors as mean time between failures, probability of failure, diagnostic coverage, safe failure fractions, and other similar criteria. These safety ratings may be achieved, at least in part, by incorporating redundancy into the safety system along with a means of cross-checking the redundant components against each other.

For example, two sensors may be used to monitor one operating condition or a single sensor may be connected to two different inputs in a controller. Still further redundancy may be achieved by providing two separate input modules operating in two separate racks having separate processors and by connecting an input signal to each of the two input modules. However, it is apparent that as redundancy increases, the complexity and number of wiring connections that are required similarly increases. Thus, it would be desirable to provide a control system that satisfies the certification requirements for a safety system while reducing the complexity and number of wiring connections.

In addition, redundant sensors and wiring do not, by themselves, satisfy the certification requirements for a safety system. A sensor may be wired to two different input modules; however, it is possible that an individual input module may experience a failure. Consequently, developers of safety systems must develop custom software to monitor the operation of the input modules. However, developing custom software adds to the cost and complexity of the safety system. Further, custom software is more likely to include errors and to require increased debugging and startup expense than a standardized software routine.

As an attempt to detect failure of an input module, custom input modules have been developed. These custom input modules have additional firmware and hardware incorporated into the module in order to integrate diagnostics within the input module such that the module is able to test whether the input module itself is operating normally or has experienced a failure. However, the additional firmware and hardware add cost and complexity to the input module. Thus, it would be desirable to provide improved reliability of an input module without the added cost or complexity of developing custom software or using a custom input module.

BRIEF DESCRIPTION OF THE INVENTION

The present invention provides a termination board for connecting signals from remote devices that provide digital signals to a controller for a safety system. The termination board provides simplified wiring between the input modules and the remote devices. In addition, the operation of the input modules and the input termination board is monitored and tested by the controller to satisfy SIL2 safety requirements.

In one embodiment of the invention, an input termination device for use in a safety system having at least one industrial controller, a first input module, a second input module, and an output module is disclosed. The input termination device includes a circuit board and a switch arranged on the circuit board to selectively supply a DC voltage to the circuit board according to a signal from the output module. A field supply connector is mounted on the circuit board, and the field supply connector has at least one terminal connected to the switch and is configured to supply DC voltage to at least one remote device. A field return connector is also mounted on the circuit board and has at least one terminal configured to accept a DC voltage input signal from the remote device. The input termination device further includes a first input module connector mounted on the circuit board and configured to transmit each of the signals from the field return connector to the first input module. A second input module connector is also mounted on the circuit board and configured to transmit each of the signals from the field return connector to the second input module Thus, it is a feature of this invention that the input termination device combines two standard input modules into a safety input module. The input termination device further provides a module to split an input signal from a remote device and to transmit the signal to the two different input modules. The input termination device also provides a switch to test the operation of each of the input module circuits. Thus the input termination device provides the additional features required to convert two standard input modules into a safety input module. Consequently, the safety control system can utilize standard input modules and leverage the modularity of a PLC to reduce installation time and startup expense in a safety controller.

As another aspect of the invention, the switch is a relay mounted on the circuit board. The relay includes a contact having an input terminal and an output terminal. The input terminal is connected to the DC voltage and the output terminal is connected to the field supply connector. The relay also includes a coil connected to the signal from the output module to selectively enable and disable the contact to supply the DC voltage to the field supply connector. The signal from the output module is controlled by a program executing on the controller.

Thus, it is another feature of this invention to provide a robust switch to control the DC voltage connected to the field supply connector. The safety controller uses the relay to test the function of the input modules in accordance with the safety requirements.

As still another aspect of the invention, the input termination device includes a first cable having preterminated ends removably connected to the first input module connector at a first end and the first input module at a second end and transmitting each of the signals from the first input module connector to the first input module. The input termination device also includes a second cable having preterminated ends removably connected to the second input module connector at a first end and the second input module at a second end and transmitting each of the signals from the second input module connector to the second input module.

Thus, it is another feature of this invention to provide cabling between the circuit board and the input modules as another component in the modular controller. Industrial controllers, including safety controllers, are typically preconfigured, such that the number and location of input modules are known. The input termination device may similarly be preconfigured, such that the length and number of required cables is known and may be provided as another modular component.

In another embodiment of the invention, a safety control system includes a controller, a first input module in communication with the controller, a second input module in communication with the controller, an output module in communication with the controller, and an input termination device. The input termination device includes a circuit board and a switch arranged on the circuit board to selectively supply a DC voltage to the circuit board according to a signal from the output module. A field supply connector is mounted on the circuit board, and the field supply connector has at least one terminal connected to the switch and is configured to supply DC voltage to at least one remote device. A field return connector is also mounted on the circuit board and has at least one terminal configured to accept a DC voltage input signal from the remote device. The input termination device further includes a first input module connector mounted on the circuit board and configured to transmit each of the signals from the field return connector to one of a plurality of inputs, or channels, on the first input module. A second input module connector is also mounted on the circuit board and configured to transmit each of the signals from the field return connector to one of a plurality of inputs, or channels, on the second input module Thus, it is a feature of this invention that the input termination device is incorporated with standard PLC modules to provide a safety control system.

As another aspect of the invention, the safety control system includes a program executing on the controller to perform an input test. The input test includes the steps of controlling the switch to remove the DC voltage from the field supply connector and identifying each of the channels on the first and the second input modules that indicate the DC voltage is still on.

Thus, it is a feature of the invention that the safety control system may test whether any of the channels on the input modules has failed.

As still another aspect of the invention, the safety control system performs the input test at a configurable time interval. Additionally, the program executing on the controller of the safety control system compares each of the channels on the first input module to the corresponding channel on the second input module. When one of the channels on the first input module is in a different state than the corresponding channel on the second input module for a predetermined time interval the program indicates a fault state.

Thus, it is still another feature of the invention that the safety control system ensures that the controller can put the machine or process into a safe state. The controller periodically verifies operation of the input modules and continuously monitors the input signals to ensure proper operation of the input modules.

As yet another aspect of the invention, the program executing on the controller of the safety control system performs an ordered shut down of the system if one of the channels indicates the DC voltage is still on during the input test. Alternately, the program may resume execution but ignore the state of each channel that indicates the DC voltage remained on during the input test. The safety control system includes an output signal that indicates it has failed the input test.

Thus, it is another aspect of the present invention that the safety control system may alternately fail in a fail-safe mode or in a fault-tolerant mode. In either case, the safety control system has an output signal that may be connected to another controller to indicate that the control system has failed.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
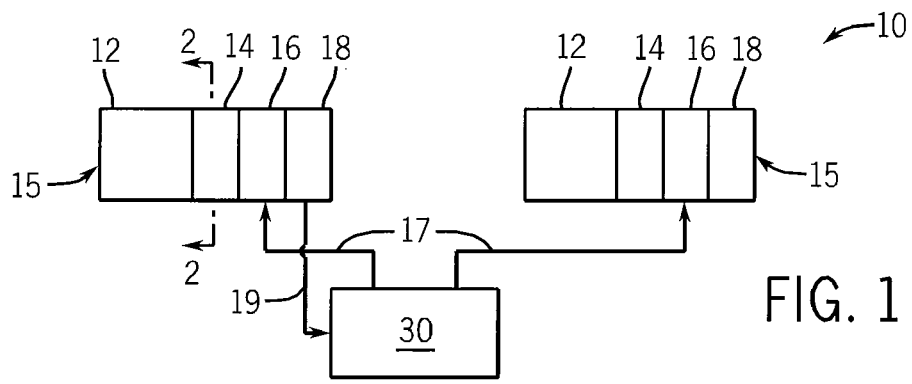
FIG. 1 is a block diagram of one embodiment of the safety control system according to the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, an exemplary embodiment of the safety control system 10 is shown having a dual controller 14 and dual rack 15 configuration. Each rack 15 includes a separate power supply 12, controller 14, input module 16 and output module 18. Each pair of input modules 16 is connected to a termination device 30 by a cable 17. The cable 17 is preferably a multi-conductor cable pre-terminated at each end such that the cable 17 may be plugged into both the termination device 30 and the input module 16. The control system 10 further includes at least one output 19 from an output module 18 connected to the termination device 30.

It is contemplated that the safety control system 10 may include many configurations as is known to one skilled in the art. For example, any number of input 16 or output 18 modules used may vary according to the configuration of the control system 10. The input 16 and output 18 modules can be plugged into or removed from the backplane 26 of the rack 15 for easy expandability and adaptability to configuration changes. Further, the control system 10 may employ a single controller 14 with multiple racks 15 or, alternately, a single controller 14 with a single rack 15 according to the requirements of the control system 10 and the safety standards for a specific application.

Figure 2:
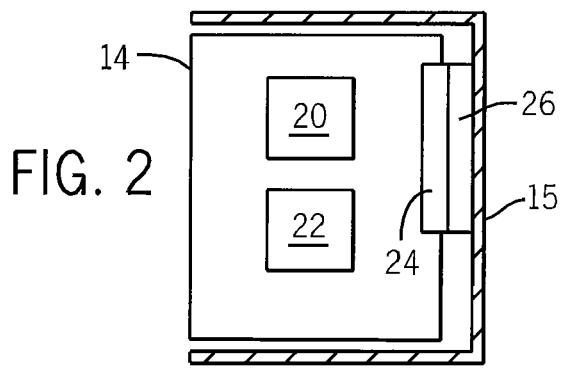
FIG. 2 is a partial block diagram of a cross-sectional view of the controller taken at 2-2 in FIG. 1.

Turning next to FIG. 2, the controller 14 includes a processor 20 and a memory device 22. The controller 14 includes a connector 24 and can be plugged into or removed from the backplane 26 of the rack 15. A program is stored in the memory device 22 and is executed on the processor 20. The controller 14 is preferably configured to communicate with the input modules 16 and the output module 18 over the backplane 26. Alternately, any means known to one skilled in the art may be used to connect the controller 14 to input 16 and output 18 modules. For example a network, such as ControlNet, DeviceNet, or Ethernet/IP, may be used to connect the controller 14 and the input and output modules 16 and 18.

Figure 3:
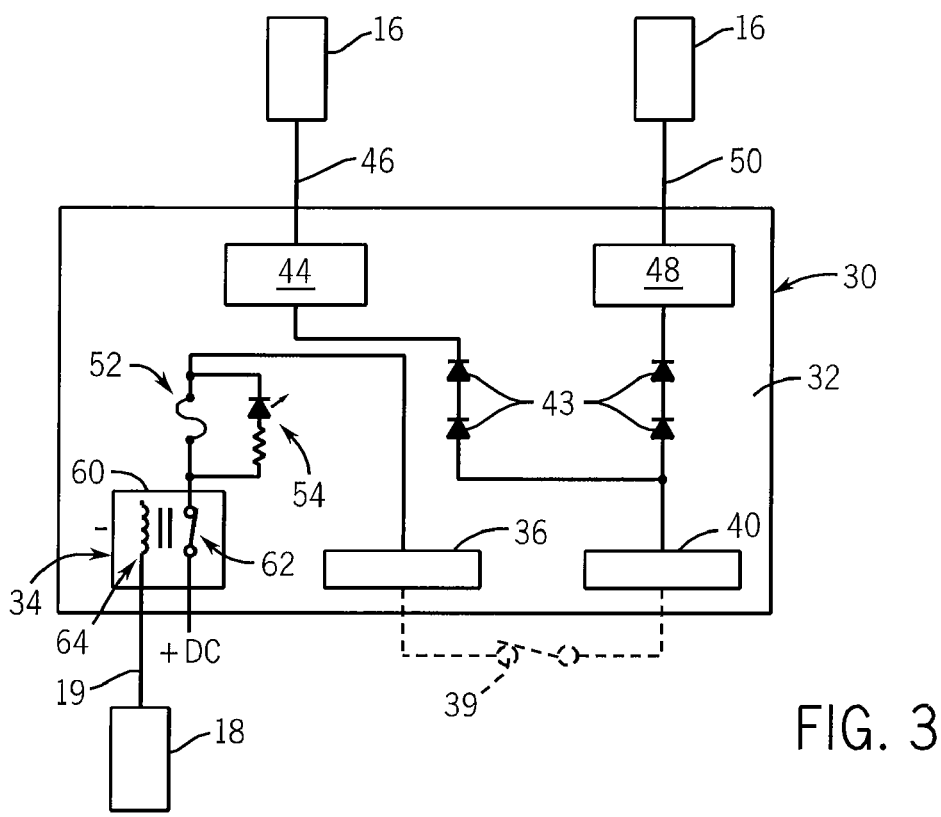
FIG. 3 is a schematic representation of one embodiment of the safety control system according to the present invention.
Figure 4:
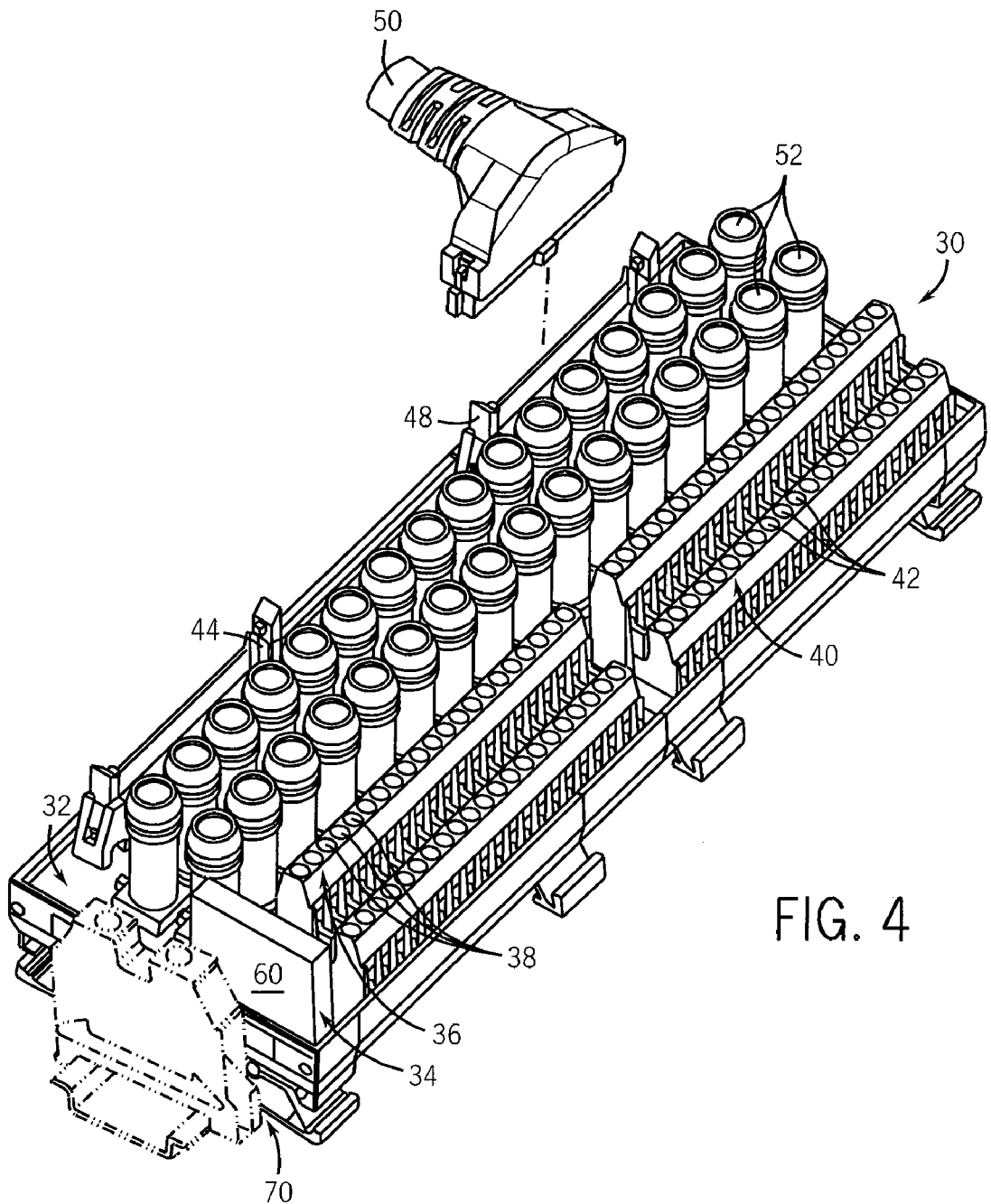
FIG. 4 is an isometric view of one embodiment of the input termination device according to the present invention.

Referring then to FIGS. 3 and 4, the input termination device 30 includes a circuit board 32 with a switch 34 mounted on the circuit board 32. The switch 34 is preferably a relay 60, but alternately may be a solid state switch, such as a transistor, or any other device suitable for selectively enabling a DC voltage, such as 24 volts DC, on the circuit board 32. A wire 19 connects the output module 18 to the coil 64 of the relay 60. The contact 62 of the relay 60 is connected in series between the DC voltage source (+DC) and at least one terminal 38 of a field supply connector 36 in order to selectively provide a DC voltage to the terminals 38 of the field supply connector 36.

The field supply connector 36 is mounted on the circuit board 32 and is preferably configured to include one terminal 38 for each of the channels available on the input module 16. Each terminal 38 may be a screw-type or screwless terminal block as is known in the art. Further, a fusible link 52 with a failure indication means 54, such as a light emitting diode (LED), is preferably connected in series between the output terminal of the contact 62 and each of the terminals 38 on the field supply connector 36. The terminals 38 of the field supply connector 36 are, in turn, connected to remote devices 39, which may be but are not limited to switches, sensors, and actuators. The field supply connector 36 transfers the DC voltage present at each of the terminals 38 to the remote device 39 connected to that terminal 39.

The remote devices 39 provide a DC voltage input signal, for example that a switch has closed or a motor is running, and are connected to terminals 42 on a field return connector 40. The field return connector 40 is mounted on the circuit board 32 and preferably includes at least one terminal 42 corresponding to each of the terminals 38 available on the field supply connector 36. Each terminal 42 may be a screw-type or screwless terminal block as is known in the art. Each terminal 42 is also connected to both the first 44 and the second 48 input module connectors, such that the input signal from each remote device 39 is sent to each of the two connectors 44 and 48.

In addition, isolation diodes 43 are preferably included in series between each terminal 42 and the first 44 and second 48 input module connectors. The diodes 43 are biased to conduct signals between the field return connector 40 and the input module connectors 44 and 48 while preventing signals from conducting in the reverse direction or between input module connectors 44 and 48. In the event that an input channel on one of the input modules 16 fails in the "on" position, the isolation diodes 43 prevent the signal from being sent between the two input modules 16 such that the operative input module 16 would be unable to detect a safety event.

The safety control system 10 further includes a first 46 and a second 50 cable connecting the first 44 and second 48 connectors to input modules 16. The first and second cables 46 and 50 are preferably multi-conductor cables with pre-terminated connectors on each end such that the each cable 46 and 50 may plug directly into the input modules 16 and each connector 44 and 48. By splitting the DC voltage input signal from each remote device to each of the connectors 44 and 48 and providing pre-terminated cables 46 and 50 between the input termination device 30 and the input modules 16, the complexity and number of wiring connections in the safety control system 10 is significantly reduced. It is further contemplated that the cables 46 and 50 may carry multiplexed or serial communication signals to reduce the number of conductors within the cable with the addition of appropriate driver hardware to the circuit board 32 and input modules 16.

The safety control system 10 is typically mounted within an enclosure. Therefore, the input termination device 30 preferably includes a connector 70 for mounting the input termination device 30 to a DIN rail. Alternately, the input termination device 30 may have other mounting means, for example holes extending through the circuit board for connecting the device 30 to stand-offs, as is known in the art. The DIN rail connector 70, in coordination with the pre-terminated cables 46 and 50 and the input modules 16, provide a generally modular connection from the digital inputs to the controller 14 in a safety control system 10, reducing the time and expense involved with commissioning the safety control system 10.

In operation, the input termination device 30 along with the program executing on the processor 20 provide safety inputs for the safety control system 10 using standard input 16 and output 18 modules. Splitting each of the input signals at the termination device 30 and passing them to a pair of input modules 16 provides redundant input signals from the remote devices 39 to the input modules 16. The program executing in the processor 20 uses these redundant input signals for comparing each channel on one input module 16 to the corresponding channel on the second input module 16 and for periodically testing operation of each input module 16.

The program continually compares each channel on one input module 16 to the corresponding channel on the second input module 16 in order to verify proper operation of both input modules 16. Because each of the input signals from the remote devices 39 are split at the input termination device 30 and sent to two separate input modules 16, each input module 16 in the pair has an identical set of signals sent to it from the remote devices 39. The program compares the state of each corresponding channel in the two input modules 16 to determine whether both channels are either on or off. The two channels may remain in a different state for a short time interval to compensate for propagation delays of each signal in the hardware. The time interval is preferably user configurable according to the system requirements, but may initially be set to the time required to perform four scans through the program. However, if the two channels are in different states beyond this time interval, the program indicates a fault condition has occurred.

The program periodically executes an input transition test to verify operation of each channel of an input module 16. As previously discussed, inputs to the safety control system 10 are configured such that a safety event is indicated by the input transitioning to a low, or off, state. If a machine or process is operating normally, the inputs remain in a high, or energized state. It is possible, that a machine or process may operate without a safety event for days or weeks or even longer. Consequently, it is possible that a channel on the input module 16 may fail such that it is stuck in the on state without the safety controller being aware of the fault condition. Therefore, the input transition test forces each channel to a low, or off, state to test for this failure condition.

The transition test first energizes an output channel on the output module 18 connected to the coil 64 of the relay 60 mounted on the circuit board 32. The coil 64 opens the normally closed relay, removing the DC voltage from the input termination device 30 and, subsequently, the field supply connector 36 and each of the remote devices. Because the safety inputs are configured to provide a normally high, or energized state, removing the DC voltage from the remote devices 39 will cause the inputs to transition to the low, or off, state. The program then monitors each channel on the input modules 16 connected to the input termination device 30 to determine whether the channel turns off after removing the DC voltage. After a sufficient time interval has passed to permit the input signal to transition states, the program identifies if any channel remained on and the input module 16 on which the channel resides, storing the information in memory 22. The time delay to permit the channel to change state may be about 100 milliseconds but is preferably user configurable according to the system requirements. The transition test then de-energizes the output connected to the coil 64 of the relay 60, permitting the relay 60 to close and reconnecting the DC voltage to the field supply connector 36 and the remote devices 39. It is contemplated that the transition test may be implemented using either normally open or normally closed outputs, relays, or contacts. One skilled in the art would recognize that an output or coil may be either energized or de-energized or a contact opened or closed using the appropriate combination of normally open or normally closed devices to achieve the same result.

The transition test is periodically executed by the program according to a user defined time interval, for example once per day. Because the program executes in conjunction with the input termination device 30 to remove the DC voltage input signals from the input modules 16, the function of each input modules may be performed with no modification of the input modules 16. Consequently, the safety control system 10 operates with standard input modules 16 and improves the reliability of the input modules 16 without requiring the end user to develop custom software or custom input modules.

If the program identifies a failed input channel, either by a miscompare between two input modules 16 or by failing the transition test, the program may either execute a controlled shut down or continue operating in a fault-tolerant mode. A controlled shut-down of the safety system is a fail-safe operating condition which allows the machine or process being monitored by the safety control system 10 to enter a safe state, preferably in a controlled manner that reduces stress and prevents damage of the machine or process. A safe state is determined according to the machine or process to be controlled but may be, but is not limited to, stopping a spinning motor, preventing an actuator from operating a press, moving a robotic assembly to a predetermined location. Alternately, the machine or process may enter a fault-tolerant operating mode and continue to operate until a later point in time at which it is convenient to repair the faulted input module 16. During fault-tolerant operation, the input test may be executed more frequently to verify that the remaining input module 16 remains fully functional. Further, whether the controller enters the fail-safe or the fault-tolerant mode of operation upon detection of a fault state is preferably user configurable according to the requirements of the machine or process being monitored by the safety control system 10 or according to safety requirements.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. An input termination device for use in a safety system, the safety system having at least one industrial controller, a first input module, a second input module, and an output module, the input termination device comprising:
    a circuit board;
    a switch arranged on the circuit board to selectively supply a DC voltage to the circuit board according to a signal from the output module;
    a field supply connector mounted on the circuit board having at least one terminal connected to the switch and configured to supply the DC voltage to at least one remote device;
    a field return connector mounted on the circuit board having at least one terminal configured to accept a DC voltage input signal from the remote device;
    a first input module connector mounted on the circuit board configured to transmit each of the signals from the field return connector to the first input module; and
    a second input module connector mounted on the circuit board configured to transmit each of the signals from the field return connector to the second input module.

2. The input termination device of claim 1 wherein the switch is a relay mounted on the circuit board, the relay further comprising:
    a contact having an input terminal and an output terminal, the input terminal connected to the DC voltage and the output terminal connected to the field supply connector; and
    a coil connected to the signal from the output module to selectively enable and disable the contact to supply the DC voltage to the field supply connector.

3. The input termination device of claim 2 wherein a program executing on the controller controls the signal from the output module to selectively enable and disable the coil.

4. The input termination device of claim 1 further comprising:
    a first cable having preterminated ends removably connected to the first input module connector at a first end and the first input module at a second end and transmitting each of the signals from the first input module connector to the first input module; and
    a second cable having preterminated ends removably connected to the second input module connector at a first end and the second input module at a second end and transmitting each of the signals from the second input module connector to the second input module.

5. The input termination device of claim 1 further comprising a fusible link connected in series between the switch and each of the terminals on the field supply connector.

6. The input termination device of claim 1 further comprising a DIN rail connector attached to the circuit board.

7. The input termination device of claim 1 further comprising at least one isolation diode connected between each signal from the field return connector and each of the first and the second input module connectors.

8. A safety control system comprising:
    a controller;
    a first input module in communication with the controller, the first input module having a plurality of input channels;
    a second input module in communication with the controller, the second input module having a plurality of input channels;
    an output module in communication with the controller, the output module having at least one output channel; and
    an input termination device comprising:
        a circuit board;
        a switch arranged on the circuit board to selectively supply a DC voltage to the circuit board according to one of the output channels on the output module;
        a field supply connector mounted on the circuit board having at least one terminal connected to the switch and configured to supply the DC voltage to at least one remote device;
        a field return connector mounted on the circuit board having at least one terminal configured to accept a DC voltage input signal from the remote device;
        a first input module connector mounted on the circuit board configured to transmit each of the signals from the field return connector to one of the plurality of input channels on the first input module; and
        a second input module connector mounted on the circuit board configured to transmit each of the signals from the field return connector to one of the plurality of input channels on the second input module.

9. The safety control system of claim 8 further comprising:
    a first cable having preterminated ends removably connected to the first input module connector at a first end and the first input module at a second end and transmitting each of the signals from the first input module connector to the first input module; and
    a second cable having preterminated ends removably connected to the second input module connector at a first end and the second input module at a second end and transmitting each of the signals from the second input module connector to the second input module.

10. The safety control system of claim 8 further comprising at least one isolation diode connected between each signal from the field return connector and each of the first and the second input module connectors.

11. The safety control system of claim 10 further comprising a fusible link connected in series between the switch and each of the terminals on the field supply connection.

12. The safety control system of claim 11 further comprising a DIN rail connector attached to the circuit board.

13. The safety control system of claim 8 wherein the switch is a relay mounted on the circuit board, the relay further comprising:
- a contact having an input terminal and an output terminal, the input terminal connected to the DC voltage and the output terminal connected to the field supply connector; and
- a coil selectively enabling and disabling the contact to supply the DC voltage to the circuit board.

14. The safety control system of claim 8 wherein the switch is selectively enabled and disabled by a program executing on the controller.

15. The safety control system of claim 14 wherein the program executing on the controller performs an input test comprising the steps of controlling the switch to remove the DC voltage from the field supply connector and identifying each of the channels on the first and the second input modules that indicate the DC voltage is still on.

16. The safety control system of claim 15 wherein the program performs the input test at a configurable time interval.

17. The safety control system of claim 14 wherein the program further executes to compare each of the channels on the first input module to the corresponding channel on the second input module.

18. The safety control system of claim 17 wherein the program indicates a fault state when one of the channels on the first input module is in a different state than the corresponding channel on the second input module for a predetermined time interval.

19. The safety control system of claim 15 wherein the program performs an ordered shut down of the system if one of the inputs indicates the DC voltage is still on during the input test.

20. The safety control system of claim 15 wherein the program resumes execution but ignores the state of each input that indicates the DC voltage remained on during the input test.

\* \* \* \* \*